United States Patent
Nonaka et al.

(10) Patent No.: US 11,040,908 B2
(45) Date of Patent: Jun. 22, 2021

(54) GLASS FIBER PRODUCTION METHOD

(71) Applicant: NITTO BOSEKI CO., LTD., Fukushima (JP)

(72) Inventors: Takashi Nonaka, Fukushima (JP); Norio Hirayama, Fukushima (JP); Kazuaki Minami, Fukushima (JP); Yosuke Nukui, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 288 days.

(21) Appl. No.: 15/752,717

(22) PCT Filed: Aug. 21, 2015

(86) PCT No.: PCT/JP2015/073630
§ 371 (c)(1),
(2) Date: Feb. 14, 2018

(87) PCT Pub. No.: WO2017/033245
PCT Pub. Date: Mar. 2, 2017

(65) Prior Publication Data
US 2018/0237335 A1    Aug. 23, 2018

(51) Int. Cl.
*C03B 37/075* (2006.01)
*C03C 13/00* (2006.01)
*C03C 3/087* (2006.01)
*C03C 3/091* (2006.01)

(52) U.S. Cl.
CPC ............ *C03C 13/00* (2013.01); *C03B 37/075* (2013.01); *C03C 3/087* (2013.01); *C03C 3/091* (2013.01); *C03B 2203/02* (2013.01)

(58) Field of Classification Search
CPC ........ C03B 37/01265; C03B 37/01268; C03B 37/01271; C03B 37/01274; C03B 37/01277
See application file for complete search history.

(56) References Cited

U.S. PATENT DOCUMENTS

| | | | | |
|---|---|---|---|---|
| 4,812,372 A | * | 3/1989 | Kithany | C03B 5/1672 219/69.15 |
| 2007/0087139 A1 | | 4/2007 | Creux et al. | |
| 2009/0286440 A1 | | 11/2009 | Lecomte et al. | |
| 2012/0129678 A1 | | 5/2012 | Tang | |
| 2012/0135849 A1 | | 5/2012 | Hoffman et al. | |
| 2012/0163987 A1 | | 6/2012 | Hausrath et al. | |
| 2013/0203583 A1 | | 8/2013 | Zhang et al. | |
| 2014/0343211 A1 | | 11/2014 | Nonaka et al. | |
| 2015/0018194 A1 | | 1/2015 | Li et al. | |

FOREIGN PATENT DOCUMENTS

| | | |
|---|---|---|
| JP | 09-142871 A | 6/1997 |
| JP | 2006-527158 A | 11/2006 |
| JP | 2008-524100 A | 7/2008 |
| JP | 2008-230949 A | 10/2008 |
| JP | 2012-531373 A | 12/2012 |
| JP | 2013-500939 A | 1/2013 |
| WO | 2011/155362 A1 | 12/2011 |
| WO | 2012/086470 A1 | 6/2012 |
| WO | 2013/084895 A1 | 6/2013 |
| WO | 2016/040425 A1 | 3/2016 |

OTHER PUBLICATIONS

Extended European search report dated Mar. 4, 2019 issued in the corresponding EP patent application No. 15902216.9.

* cited by examiner

Primary Examiner — Cynthia Szewczyk
(74) Attorney, Agent, or Firm — Carrier Blackman & Associates, P.C.; Joseph P. Carrier; William D. Blackman

(57) ABSTRACT

Provided is a method for producing glass fiber, capable of stably performing the spinning of glass fibers without mixing of red crystals in glass fibers. When glass fibers are formed by discharging, from a nozzle tip, a molten glass obtained by melting glass raw materials mixed so as to give a glass composition including, when melted, in relation to the total amount thereof, $SiO_2$ in a range from 57.0 to 62.0% by mass, $Al_2O_3$ in a range from 15.0 to 20.0% by mass, MgO in a range from 7.5 to 12.0% by mass, and CaO in a range from 9.0 to 16.5% by mass, and having a total content of $SiO_2$, $Al_2O_3$, MgO and CaO of 98.0% by mass or more, the glass composition includes $B_2O_3$, $Li_2O$, or $B_2O_3$ and $Li_2O$ as an additive or additives capable of suppressing the generation of red crystals.

11 Claims, 11 Drawing Sheets

Example 1 (B$_2$O$_3$: 0.5% by mass)

500μm

Example 2 (B$_2$O$_3$: 1.0% by mass)

500μm

Example 3 ($B_2O_3$: 1.5% by mass)

500μm

Example 4 ($Li_2O$: 0.6% by mass)

500μm

Example 5 ($Li_2O$: 1.0% by mass)

500μm

Example 6 ($B_2O_3$: 0.6% by mass, $Li_2O$: 0.3% by mass)

500μm

Example 7 ($B_2O_3$: 0.9% by mass, $Li_2O$: 0.1% by mass)

500μm

Example 8 ($B_2O_3$: 0.5% by mass)

500μm

Example 9 ($B_2O_3$: 1.0% by mass)

500μm

Example 10 ($B_2O_3$: 1.5% by mass)

500μm

Example 11 ($B_2O_3$: 1.0% by mass)

500μm

Example 12 ($B_2O_3$: 1.0% by mass)

500μm

Example 13 ($B_2O_3$: 1.0% by mass)

500μm

Example 14 ($B_2O_3$: 1.0% by mass)

500μm

Comparative Example 1 (additive: absent)

500μm

Comparative Example 2 (Na$_2$O: 1.0% by mass)

500μm

Comparative Example 3 ($K_2O$: 1.0% by mass)
500μm

Comparative Example 4 (SrO: 1.0% by mass)
500μm

Comparative Example 5 ($Y_2O_3$: 1.0% by mass)

Comparative Example 6 ($B_2O_3$: 1.0% by mass)

Comparative Example 7 ($B_2O_3$: 1.0% by mass)

GLASS FIBER PRODUCTION METHOD

TECHNICAL FIELD

The present invention relates to a method for producing glass fiber.

BACKGROUND ART

Glass fibers are produced as follows: glass raw materials mixed so as to give a glass composition having a desired composition were melted in a melting furnace to prepare molten glass (glass composition melt), the molten glass is discharged from a vessel (bushing) having a nozzle plate in which tens to thousands of nozzle tips are formed, the discharged molten glass is taken up at a high speed and thus cooled while being stretched, and thus solidified into fiber shapes (hereinafter, this operation is sometimes referred to as "spinning"). The bushing is formed of, for example, a noble metal such as platinum.

As a glass for forming the glass fiber, there has been known a glass (S-glass) having a composition composed of $SiO_2$, $Al_2O_3$ and MgO. According to S-glass, glass fibers having high fiber strength and high fiber modulus of elasticity can be obtained as compared with general-purpose glass such as E-glass. However, S-glass is problematic in that the spinning of glass fiber is not always easy in view of the 1000-poise temperature and the liquid phase temperature.

The 1000-poise temperature as referred to herein means the temperature at which the viscosity of the molten glass becomes 1000 poises (100 Pa·s), and the liquid phase temperature as referred to herein means the temperature at which crystals start to precipitate when the temperature of the molten glass is being lowered. In general, glass fibers can be efficiently spun when the viscosity of the molten glass is in the vicinity of 1000 poises. Accordingly, usually the wider the temperature range (working temperature range) between the 1000-poise temperature and the liquid phase temperature, the more easily and the more stably the spinning of glass fibers can be performed.

In S-glass, the 1000-poise temperature and the liquid phase temperature are extremely close to each other, and the working temperature range is narrow. Accordingly, molten S-glass tends to undergo crystallization (devitrification) even under the effect of slight temperature decrease. Accordingly, in order to stably perform the spinning of S-glass, it is necessary to accurately control the spinning conditions in the production process of glass fibers.

Thus, as a glass composition for glass fiber, produced more easily than S-glass and having a higher fiber strength and a higher fiber modulus of elasticity than the general-purpose glass, the present applicant has proposed a glass composition having the composition in which, in relation to the total amount of the glass composition, the content of $SiO_2$ is 57.0 to 63.0% by mass, the content of $Al_2O_3$ is 19.0 to 23.0% by mass, the content of MgO is 10.0 to 15.0% by mass, the content of CaO is 4.0 to 11.0% by mass, and the sum content of $SiO_2$, $Al_2O_3$, MgO and CaO is 99.5% by mass or more (see Patent Literature 1).

According to the glass composition described in Patent Literature 1, the 1000-poise temperature and the liquid phase temperature can be lowered, and it is possible to easily produce glass fibers having a higher fiber strength and a higher fiber modulus of elasticity than the general-purpose glass, by spinning the molten glass prepared by melting the glass raw materials mixed so as to give the glass composition having the composition falling within the foregoing ranges.

In the spinning of the molten glass prepared by melting the glass raw materials mixed so as to give the glass composition having the composition falling within the range described in Patent Literature 1, a bushing provided with circular nozzle tips is usually used, and the bushing is set at a temperature higher than the liquid phase temperature of the molten glass. In this way, the molten glass discharged from the circular nozzle tips is strongly affected by the surface tension of itself to become round, and thus it is possible to easily obtain glass fibers having cross sectional shapes close to a perfect circle. When the viscosity of the molten glass is 200 poises (20 Pa·s) or less, the glass discharged from the nozzle tips takes droplet shapes without forming fibers. Accordingly, the bushing is controlled at a temperature equal to or lower than the temperature at which the viscosity of the molten glass is 200 poises.

In order to obtain glass fibers having modified cross sections such as flat shape, a bushing provided with flat-shaped nozzle tips is used. When a molten glass is spun at a viscosity of 1000 poises or less, the viscosity of the glass discharged from the nozzle tips is too low, and the discharged glass becomes round due to the surface tension of itself so as to make it difficult to obtain glass fibers having modified cross sections. Accordingly, a bushing provided with flat-shaped nozzle tips is controlled at a temperature which is higher than the liquid phase temperature of the molten glass and at which the viscosity of the molten glass is 1000 poises or more. In this way, the viscosity of the molten glass discharged from the flat-shaped nozzle tips is heightened, the surface tension of the molten glass itself is made difficult to function, and thus it is possible to obtain glass fibers having modified cross sections such as the flat shapes in accordance with the shapes of the openings of the nozzle tips.

CITATION LIST

Patent Literature

Patent Literature 1
International Publication No. WO 2011/155362

SUMMARY OF INVENTION

Technical Problem

However, there is an inconvenience that the spinning of the molten glass prepared by melting the glass raw materials mixed so as to give the glass composition having the composition falling within the range described in Patent Literature 1 causes the mixing of red crystals in the obtained glass fibers, spun fiber breakage occurs frequently, and the productivity degradation is sometimes caused.

An object of the present invention is to provide, by solving such an inconvenience, a method for producing glass fiber, capable of stably performing the spinning without mixing of red crystals in the glass fibers and capable of obtaining glass fibers having a higher fiber strength and a higher fiber modulus of elasticity than the general-purpose glass (E-glass).

Solution to Problem

The present inventors made a diligent study on the causes and the conditions for the mixing of red crystals in the obtained glass fibers in the spinning of the molten glass prepared by melting the glass raw materials mixed so as to give the glass composition having the composition falling within the range described in Patent Literature 1.

Consequently, the present inventors have discovered that the red crystals sometimes occur during the production of glass fibers having modified cross sections such as flat shapes or glass fibers having perfect circular cross sections of 3 μm or more and less than 10 μm in fiber diameter, by discharging, from the nozzle chips of the bushing, the molten glass as the glass composition obtained by melting the glass raw materials in a large size furnace having a monthly production capacity of a few hundred tons or more.

The present inventors have also discovered that in the case of the production of glass fibers having modified cross sections such as flat shapes, red crystals are generated when the temperature decrease occurs at the ends inside the bushing or in the vicinity of the nozzle chips, due to the breakage of spun fibers or the temperature variation of the external environment.

Moreover, the present inventors have discovered that in the case of the production of glass fibers having perfect circular cross sections of 3 μm or more and less than 10 μm in fiber diameter, red crystals are generated when the temperature region lower than the controlled temperature occurs in the ends inside the bushing or the upper portion of the bushing because the amount of the molten glass flowing into the bushing is small, accordingly the heat brought into the bushing by the molten glass is decreased.

In the large size furnace, heating is performed by, for example, indirect flame heating using gas burners, and chromium oxide bricks, excellent in glass corrosion resistance at high temperatures, are used in the portion brought into contact with the molten glass. The red crystals are probably precipitated as follows: the Cr component contained in the chromium oxide bricks is eluted into the molten glass, and when the molten glass stagnates in the interior of the bushing or in the upper temperature-lowered portion of the bushing, the eluted Cr component and the components in the glass react with each other, and the Cr component is precipitated as spinel crystals composed of composite oxides of Cr, Mg and Al.

The present inventors made further investigations on the basis of the foregoing findings, and have reached the present invention by consequently discovering that the foregoing inconvenience can be solved by allowing, when glass fibers are produced by spinning the molten glass prepared by melting the glass raw materials mixed so as to give a specific glass composition, the glass composition to include an additive capable of suppressing the generation of the red crystals.

Accordingly, in order to achieve the above-described object, in the method for producing glass fiber of the present invention, when glass fibers are formed by discharging, from a nozzle tip, a molten glass obtained by melting glass raw materials mixed so as to give a glass composition including, when melted, in relation to the total amount thereof, $SiO_2$ in a range from 57.0 to 62.0% by mass, $Al_2O_3$ in a range from 15.0 to 20.0% by mass, MgO in a range from 7.5 to 12.0% by mass, and CaO in a range from 9.0 to 16.5% by mass, and having a total content of $SiO_2$, $Al_2O_3$, MgO and CaO of 98.0% by mass or more, the glass composition includes $B_2O_3$, $Li_2O$, or $B_2O_3$ and $Li_2O$, as an additive or additives capable of suppressing generation of red crystals.

According to the method for producing glass fiber of the present invention, the glass composition includes $SiO_2$, $Al_2O_3$, MgO and CaO in the above-described ranges, and further includes $B_2O_3$, $Li_2O$, or $B_2O_3$ and $Li_2O$ as an additive or additives capable of suppressing the generation of the red crystals; thus, the mixing of the red crystals in the obtained glass fibers can be prevented, and the production of glass fibers can be stably performed.

In the method for producing glass fiber of the present invention, when the content of $SiO_2$ in relation to the total amount of the glass composition is less than 57.0% by mass, it is not able to improve the mechanical strength of the obtained glass fibers, and the obtained glass fibers are chemically unstable. On the other hand, in the glass composition, when the content of SiO2 in relation to the total amount of the glass composition exceeds 62.0% by mass, the 1000-poise temperature and the liquid phase temperature are heightened, and the production of glass fibers is made difficult.

In the glass composition, the content of $SiO_2$ in relation to the total amount of the glass composition is set to fall preferably within a range from 57.2 to 60.5% by mass, more preferably within a range from 57.5 to 59.5% by mass, further preferably within a range from 58.0 to 59.3% by mass, particularly preferably within a range from 58.2 to 59.0% by mass, and most preferably within a range from 58.5 to 58.8% by mass. In this way, the glass composition for glass fiber can obtain an effect to be able to maintain a wide working temperature range while the high fiber strength is being maintained.

In the glass composition, when the content of $Al_2O_3$ in relation to the total amount of the glass composition is less than 15.0% by mass, it is not able to heighten the fiber modulus of elasticity of the obtained glass fibers, and when the content of $Al_2O_3$ in relation to the total amount of the glass composition exceeds 20.0% by mass, the liquid phase temperature is heightened and accordingly the working temperature range is narrowed. When the content of $Al_2O_3$ exceeds 20.0% by mass, the red crystals tend to be generated.

In the glass composition, the content of $Al_2O_3$ in relation to the total amount of the glass composition is set to fall preferably within a range from 16.8 to 19.8% by mass, more preferably within a range from 18.0 to 19.5% by mass, and further preferably within a range from 18.2 to 19.0% by mass. In this way, the glass composition can obtain an effect to be able to suppress the precipitation of the red crystals while the high fiber modulus of elasticity is being maintained.

In the glass composition, when the content of MgO in relation to the total amount of the glass composition is less than 7.5% by mass, it is not able to heighten the fiber modulus of elasticity of the obtained glass fibers, and when the content of MgO in relation to the total amount of the glass composition exceeds 12.0% by mass, the liquid phase temperature is heightened, and accordingly the working temperature range is narrowed. When the content of MgO exceeds 12.0% by mass, the red crystals tend to be generated.

In the glass composition, the content of MgO in relation to the total amount of the glass composition is set to fall preferably within a range from 8.3 to 11.8% by mass, more preferably within a range from 8.8 to 11.5% by mass, and further preferably within a range from 9.0 to 11.0% by mass. In this way, the glass composition for glass fiber can obtain an effect to be able to maintain a wide working temperature range while the high fiber modulus of elasticity is being maintained.

In the glass composition, when the content of CaO in relation to the total amount of the glass composition is less than 9.0% by mass, the liquid phase temperature is heightened, accordingly the working temperature range is narrowed, and the red crystals tend to be generated. When the content of CaO exceeds 16.5% by mass, it is impossible to heighten the fiber modulus of elasticity of the obtained glass fibers, and the linear expansion coefficient of the glass fiber is enlarged.

In the glass composition, the content of CaO in relation to the total amount of the glass composition is set to fall preferably within a range from 9.9 to 14.4% by mass, more preferably within a range from 10.3 to 12.5% by mass, and further preferably within a range from 10.5 to 12.0% by mass. In this way, the glass composition for glass fiber can obtain an effect to be able to suppress the precipitation of the red crystals while the low linear expansion coefficient is being maintained.

In the glass composition, when the total content of $SiO_2$, $Al_2O_3$, MgO and CaO in relation to the total amount of the glass composition is less than 98.0% by mass, the content of other impurity components comes to be relatively larger. Consequently, the working temperature range is narrowed, or it is not able to heighten the fiber strength or the fiber modulus of elasticity of the obtained glass fibers. In the glass composition, the total content of $SiO_2$, $Al_2O_3$, MgO and CaO in relation to the total amount of the glass composition is preferably 98.0% by mass or more and less than 99.5% by mass and more preferably 98.5% by mass or more and less than 99.0% by mass. In this way, in the glass composition, the working temperature range can be widened, and it is possible to heighten the fiber strength and the fiber modulus of elasticity of the obtained glass fibers.

The main impurities capable being contained in the glass composition are $Na_2O$, $K_2O$ and $Fe_2O_3$. These can be contained in a total content of 0.1 to 2.0% by mass in relation to the total amount of the glass composition. In order to widen the working temperature range and to heighten the fiber strength and the fiber modulus of elasticity of the obtained glass fibers, the total content of the $Na_2O$, $K_2O$ and $Fe_2O_3$ is preferably suppressed to be 0.1 to 0.5% by mass in relation to the total amount of the glass composition.

The method for producing glass fiber of the present invention can be suitably used when the glass fibers each have a modified cross sectional shape in which a ratio (major axis/minor axis) of the major axis to the minor axis of the cross sectional shape falls within a range from 2.0 to 6.0, or the fiber diameter defined as a diameter when a cross-sectional area is converted to a perfect circle, falls within a range from 10 to 30 μm. In each of the glass fibers, the ratio (major axis/minor axis) of the major axis to the minor axis of the cross sectional shape may fall within a range from 2.0 to 6.0, and the fiber diameter defined as the diameter of the perfect circle having the same areas as the actual cross-sectional area of the fiber may fall within a range from 10 to 30 μm.

Examples of the cross sectional shapes possessed by glass fibers having such modified cross sections include: an elongated oval shape (a rectangle with two semicircles on both ends, added outside; or a shape similar to this shape), an oval shape, and a cocoon-like shape narrow in the lengthwise mid-portion; the cross section of the glass fibers is preferably an elongated oval shape because the elongated oval shape leads to an excellent fluidity in the production of the resin molded articles including the glass fibers.

According to the method for producing glass fiber of the present invention, when the glass fibers have the modified cross sections, the mixing of the red crystals in the obtained glass fibers can be prevented, and the production of the glass fibers can be stably performed.

The method for producing glass fiber of the present invention is also suitable even when the glass fibers have perfect circular cross sections, and fiber diameters falling within a range of 3 μm or more to less than 10 μm. According to the method for producing glass fiber of the present invention, even when the glass fibers have the perfect circular cross sections and the fiber diameters falling within the above-described range, the mixing of the red crystals in the obtained glass fibers can be prevented, and the production of the glass fibers can be stably performed.

Moreover, the method for producing glass fiber of the present invention can be suitably used when the glass raw materials mixed so as to give the glass composition are melted by using a melting furnace in which a portion in contact with the molten glass is formed of bricks containing chromium oxide. According to the method for producing glass fiber of the present invention, even when the glass composition is melted by using the foregoing melting furnace using the chromium oxide bricks, the mixing of the red crystals in the obtained glass fibers can be prevented, and the production of the glass fibers can be stably performed.

In the method for producing glass fiber of the present invention, as the additive capable of suppressing the generation of the red crystals, $B_2O_3$ and $Li_2O$ can be used each alone, or a mixture composed of $B_2O_3$ and $Li_2O$ can be used; the glass composition includes the additive capable of suppressing the generation of the red crystals preferably within a range from 0.5 to 1.5% by mass in relation to the total amount of the glass composition.

According to the method for producing glass fiber of the present invention, by setting, in relation to the total amount of the glass composition, the contents of $SiO_2$, $Al_2O_3$, MgO and CaO so as to fall within the above-described ranges, respectively, even when the additive capable of suppressing the generation of the red crystals is added in an amount within the above-described range, it is possible to produce glass fibers having a higher fiber strength and a higher fiber modulus of elasticity than the general-purpose glass (E-glass).

When the content of the additive capable of suppressing the generation of the red crystals is less than 0.5% by mass in relation to the total amount of the glass composition, the mixing of the red crystals in the obtained glass fibers sometimes cannot be prevented; and when the content of the additive exceeds 1.5% by mass in relation to the total amount of the glass composition, the physical properties of the obtained glass fibers are sometimes impaired.

The glass composition includes, in relation to the total amount thereof, the additive capable of suppressing the generation of the red crystals preferably within a range from 0.6 to 1.4% by mass, more preferably within a range from 0.7 to 1.3% by mass, further preferably within a range from 0.8 to 1.2% by mass, and particularly preferably within a range from 0.9 to 1.1% by mass.

By setting the content of the additive capable of suppressing the generation of the red crystals within such ranges as described above, it is possible to obtain an effect to be able to suppress the generation of the red crystals in the obtained glass fibers while the high fiber modulus of elasticity is being maintained in the obtained glass fibers.

When an additive composed of $B_2O_3$ and $Li_2O$ is used as the component capable of suppressing the generation of the red crystals, the ratio ($Li_2O$ (% by mass)/$B_2O_3$ (% by mass)) of the content (% by mass) of $Li_2O$ to the content (% by mass) of $B_2O_3$ preferably falls within a range from 0 to 1.0.

By setting the ratio of the content (% by mass) of $Li_2O$ to the content (% by mass) of $B_2O_3$ so as to fall within such a range, it is possible to obtain an effect to be able to maintain the high fiber strength and the low linear expansion coefficient in the obtained glass fibers.

In the glass composition, the ratio ((additive capable of suppressing generation of red crystals (% by mass)×CaO (% by mass))/$Al_2O_3$ (% by mass)) of the content (% by mass) of the product between the content (% by mass) of the additive capable of suppressing the generation of the red crystals and the content (% by mass) of CaO to the content (% by mass) of $Al_2O_3$ preferably falls within a range from 0.25 to 1.00. In particular, when the content of $Al_2O_3$ is 19.5% by mass or less, (additive capable of suppressing generation of red crystals (% by mass)×CaO (% by mass))/$Al_2O_3$ (% by mass) more preferably falls within a range from 0.28 to 0.95. Moreover, when the content of $Al_2O_3$ is 19.5% by mass or less, the ratio ($Li_2O$ (% by mass)/$B_2O_3$ (% by mass)) of the content (% by mass) of $Li_2O$ to the content (% by mass) of $B_2O_3$ particularly falls within a range from 0 to 1.0, and the ratio (additive capable of suppressing generation of red crystals (% by mass)×CaO (% by mass))/$Al_2O_3$ (% by mass) particularly preferably falls within a range from 0.28 to 0.64. By setting the ratio of the product between the content (% by mass) of the additive capable of suppressing the generation of the red crystals and the content (% by mass) of CaO to the content (% by mass) of $Al_2O_3$ so as to fall within such a range, it is possible to obtain an effect to be able to suppress the generation of the red crystals in the obtained glass fibers while the high fiber strength and the high fiber modulus of elasticity are being maintained in the obtained glass fibers.

In the glass composition of the present invention, the measurements of the above-described respective components can be performed for B or Li, a light element, by using an ICP atomic emission spectroscopy, and for the other elements by using a wavelength dispersive X-ray fluorescence spectroscopy.

Specifically, the measurement method is described. First, a glass batch (a mixture prepared by mixing the glass raw materials), or glass fibers (used after removing an organic substance(s), for example, by heating in a muffle furnace set at 300 to 600° C. for approximately 2 to 24 hours, when organic substances attach to the surface of the glass fibers, or when the glass fibers are included in an organic substance (resin) as an reinforcing material) are placed in a platinum crucible, and maintained in an electric furnace at a temperature of 1550° C. for 6 hours to be melted under stirring to yield a uniform molten glass. Next, the obtained molten glass is allowed to flow out on a carbon plate to prepare glass cullet, and then the cullet is crushed into a powder. Light elements, B and Li, are quantitatively analyzed by using an ICP atomic emission spectroscopy, in case of B, after the glass powder is subjected to alkali fusion decomposition, or, in case of Li, after the glass powder is subjected to an acid dissolution. The other elements are quantitatively analyzed by using a wavelength dispersive X-ray fluorescence spectroscopy, after the glass powder is molded into a circular disk shape with a pressing machine. The contents and the total amount of the respective components are calculated by converting these quantitative analysis results into the values expressed in terms of oxides, and from the resulting numerical values, the above-described contents of the respective components can be determined.

The additive capable of suppressing the generation of the red crystals is added simultaneously when the glass raw materials are mixed with each other.

In the method for producing glass fiber of the present invention, an 1000-poise temperature of the glass composition is preferably a temperature falling within a range from 1300 to 1370° C., and a liquid phase temperature of the glass composition is preferably a temperature falling within a range from 1200 to 1270° C.

In the glass composition, the 1000-poise temperature is a temperature falling within a range from 1300 to 1370° C., the liquid phase temperature is a temperature falling within a range from 1200 to 1270° C., and a working temperature range is 50° C. or higher, and accordingly, a stable spinning is made possible, and the glass composition is suitable for a large-scale production of glass fibers, having a monthly production capacity of a few hundred tons or more.

In addition, in the method for producing glass fiber of the present invention, the glass fiber produced from the glass composition is preferably such that the fiber modulus of elasticity, and the fiber strength are 80 GPa or more, and 4.0 GPa or more, respectively. According to the method for producing glass fiber of the present invention, it is possible to obtain glass fibers having a higher fiber strength and a higher fiber modulus of elasticity than the general-purpose glass (E-glass) by setting the fiber modulus of elasticity, and the fiber strength so as to fall within the above-described ranges, respectively.

DESCRIPTION OF EMBODIMENTS

Figure 1:
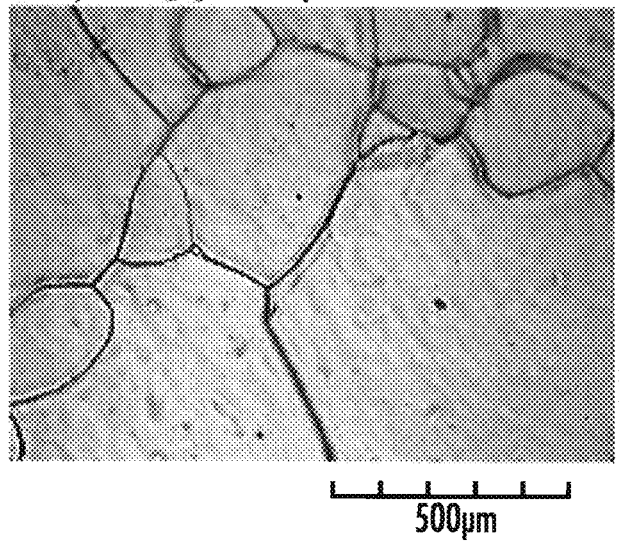
FIG. 1 is a laser microscope photograph showing the occurrence or nonoccurrence of the red crystals in the glass obtained from the glass composition of Example 1.

Hereinafter, the embodiments of the present invention are described in more detail.

In the method for producing glass fiber of the present embodiment, first, there is obtained a glass batch prepared by mixing the glass raw materials so as to give, when the resulting mixture is melted, a glass composition having a composition including, in relation to the total amount thereof, $SiO_2$ in a range from 57.0 to 62.0% by mass, $Al_2O_3$ in a range from 15.0 to 20.0% by mass, MgO in a range from 7.5 to 12.0% by mass, CaO in a range from 9.0 to 16.5% by mass, and a component capable of suppressing the generation of the red crystals in a range from 0.5 to 1.5% by mass, and having a total content of $SiO_2$, $Al_2O_3$, MgO and CaO of 98.0% by mass or more. As the additive (hereinafter, abbreviated as the red crystal suppressing additive) capable of suppressing the generation of the red crystals, $B_2O_3$ and $Li_2O$ can be used each alone, or a mixture composed of $B_2O_3$ and $Li_2O$ can be used.

In the glass composition having the foregoing composition, the 1000-poise temperature is a temperature falling within a range from 1300 to 1370° C., and the liquid phase temperature is a temperature falling within a range from 1200 to 1270° C.

Next, the glass batch is supplied to a melting furnace, and melted in a temperature region equal to or higher than the 1000-poise temperature, specifically at a temperature falling within a temperature range from 1450 to 1550° C. The molten glass melted at the foregoing temperature is discharged from the nozzle tips of a bushing controlled at a predetermined temperature, taken up at a high speed and thus cooled while being stretched, and thus solidified to form glass fibers.

The foregoing melting furnace is a large-scale furnace having a monthly production capacity of a few hundred tons or more, the heating in the furnace is performed by, for example, indirect flame heating using gas burners, and chromium oxide bricks, excellent in glass corrosion resistance at high temperatures, are used in the portion brought into contact with the molten glass.

As the foregoing nozzle tips, for example, when glass fibers having modified cross-sections such as flat shapes are produced, it is possible to use nozzle tips formed in the nozzle plate on the bottom of the bushing, with the openings (orifice holes) each having an opening size such that the ratio (major axis/minor axis) of the major axis to the minor axis falls within a range from 2 to 10, and the major axis is 1.0 to 10.0 mm and the minor axis is 0.5 to 2.0 mm, wherein the nozzle tips have cooling devices such as notches or protrusions to rapidly cool the molten glass having passed through the openings.

As the foregoing nozzle tips, for example, when glass fibers having perfect circular cross sections and having a fiber diameter of 3 μm or more and less than 10 μm are produced, it is possible to use nozzle tips each provided with a circular opening having an opening diameter of 0.5 to 1.5 mm.

When the glass fibers having the modified cross sections such as the flat shapes are produced, the controlled temperature of the bushing is 1260 to 1370° C. When the controlled temperature of the bushing is lower than 1260° C., the viscosity of the molten glass is extremely high, and in addition, the controlled temperature approaches the liquid phase temperature; consequently, the crystals originating from the glass (devitrification) tend to be precipitated, the discharge from the nozzle tips is made difficult and the production of the glass fibers themselves is made difficult. When the controlled temperature of the bushing exceeds 1370° C., the viscosity of the molten glass is lowered, the surface tension is allowed to act easily, and hence it is impossible to produce glass fibers having modified cross sections such as flat shapes.

When glass fibers having perfect circular cross sections and having a fiber diameter of 3 μm or more and less than 10 μm are produced, the controlled temperature of the bushing is 1300 to 1470° C. When the controlled temperature of the bushing is lower than 1300° C., the viscosity of molten glass is high, accordingly the discharge from thin nozzle tips is difficult and the production of the glass fibers themselves is made difficult. When the controlled temperature of the bushing exceeds 1470° C., the molten glass discharged from the nozzle tips turns into droplets but not into fibers.

In the production method of the present embodiment, by producing glass fibers as described above, the spinning can be stably performed without mixing of the red crystals in glass fibers having modified cross sections such as the flat shapes, or glass fibers having perfect circular cross sections and having fiber diameters of 3 μm or more and less than 10 μm.

The glass fibers having modified cross sections can be made to each have the ratio (major axis/minor axis) of the major axis to the minor axis of the cross sectional shape falling within a range from 2.0 to 6.0, or made to each have the fiber diameter defined as the diameter of the perfect circle having the same area as the actual cross-sectional area of the fiber falling within a range from 10 to 30 μm. In each of the glass fibers having modified cross sections, the ratio of the major axis to the minor axis of the cross sectional shape may fall within a range from 2.0 to 6.0, and the fiber diameter defined as the diameter of the perfect circle having the same areas as the actual cross-sectional area of the fiber may fall within a range from 10 to 30 μm.

Hereinafter, Examples and Comparative Examples of the present invention are presented.

EXAMPLES

Example 1

In present Example, first, there was obtained a glass batch prepared by mixing the glass raw materials so as to give, when the resulting mixture was melted, a melt (molten glass) of a glass composition including, in relation to the total amount thereof, $SiO_2$ in a content of 59.3% by mass, $Al_2O_3$ in a content of 19.0% by mass, MgO in a content of 10.0% by mass, CaO in a content of 11.0% by mass, $B_2O_3$ in a content of 0.5% by mass, and $Na_2O$, $K_2O$ and $Fe_2O_3$ as the other components in a content of 0.2% by mass. In the glass composition of present Example, the total content of $SiO_2$, $Al_2O_3$, MgO and CaO is 99.3% by mass. The composition of the glass composition obtained by melting the glass batch of present Example is shown in Table 1.

Next, the glass batch was placed in a platinum crucible, and maintained in an electric furnace at a temperature of 1550° C. for 6 hours to be melted under stirring to yield a uniform molten glass. Next, the obtained molten glass was allowed to flow out on a carbon plate to prepare glass cullet. In this case, the 1000-poise temperature and the liquid phase temperature of the molten glass were measured, and the working temperature range (ΔT) was calculated.

The glass cullet was melted in a platinum crucible by using a high temperature electric furnace equipped with a rotational viscometer (manufactured by Shibaura System Co., Ltd.), and the 1000-poise temperature was determined by measuring the temperature corresponding to the rotational viscosity of 1000 poises by continuously measuring the viscosity of the molten glass while the melting temperature was being varied by using a Brookfield rotation type viscometer.

The liquid phase temperature was determined by the following procedure. First, the glass cullet was crushed, 40 g of the resulting glass particles having particle sizes of 0.5 to 1.5 mm were placed in a 180×20×15 mm platinum boat and heated for 8 hours or more in a tubular electric furnace having a temperature gradient of 1000 to 1400° C., then the glass particles were taken out from the tubular electric furnace and observed with a polarization microscope, and the positions from which the crystals (devitrification) originating from the glass started to be precipitated were specified. The temperature inside the tubular electric furnace was measured by using a type B thermocouple, and the temperature of the position at which the precipitation started was determined to be taken as the liquid phase temperature.

The difference between the 1000-poise temperature and the liquid phase temperature measured by the foregoing methods was calculated as the working temperature range (ΔT).

Next, the obtained glass cullet was placed in a small cylindrical platinum bushing having a circular nozzle tip on the bottom of the vessel, and melted by heating to a predetermined temperature; the molten glass discharged from the nozzle tip was taken up at a predetermined speed and thus cooled and solidified while being stretched, and thus glass fibers having perfect circular cross sections and having a fiber diameter of 13 μm were obtained.

Next, a string of fiber (monofilament) between a nozzle tip and the winder was sampled, a string of fiber free from degradation due to contact or friction was used as a sample, and the fiber strength and the fiber modulus of elasticity of the glass fibers obtained in present Example were measured.

The fiber strength was obtained as follows: a monofilament free from scratches, degradations and the like due to contact, friction and the like was allowed to adhere to a sheet of predetermined backing paper with a hole of 25 mm in diameter in the center thereof to prepare a specimen, the specimen was set to the grips of a tensile tester (manufactured by Orientec Co., Ltd.), the ends of the sheet of backing paper were cut off, then a tensile test was performed at a crosshead speed of 5 mm/min, and the fiber strength was calculated from the maximum load value at break and the fiber cross-sectional area. The fiber cross-sectional area was calculated from the fiber diameter obtained by observing the monofilament with a scanning electron microscope (trade name: S-3400, manufactured by Hitachi, Ltd.). Those specimens undergoing filament cast-off or filament crease during the measurement were excluded, and the average value of the fiber strength values of the 30 specimens was taken as the measurement value of the fiber strength.

The fiber modulus of elasticity was obtained as follows: the monofilament was allowed to adhere to a sheet of predetermined backing paper with a hole of 50 mm in diameter in the center thereof to prepare a specimen, the specimen was set to the grips of the foregoing tensile tester, the ends of the sheet of backing paper were cut off, then a tensile test was performed at a crosshead speed of 5 mm/min, and the fiber modulus of elasticity was calculated from the initial strength variation value and the corresponding rate of elongation. Those specimens undergoing filament cast-off during the measurement were excluded, and the average value of the fiber modulus of elasticity values of the 15 specimens was taken as the measurement value of the fiber modulus of elasticity. The results thus obtained are shown in Table 1.

Next, in present Example, the relationship between the glass composition and the red crystal suppressing component and the red crystals was verified by reproducing the situation leading to the generation of the rarely-occurring red crystals in the production of glass fibers.

In present Example, $Cr_2O_3$ was added to the glass composition in order to reproduce the situation leading to the generation of the red crystals, the addition amount of $Cr_2O_3$ was based on the maximum concentration of $Cr_2O_3$ included in the glass lump staying in the glass melting furnace in which the portion in contact with the molten glass is formed of the chromium oxide bricks. In the glass lump, the $Cr_2O_3$ eluted over a long period of time from the chromium oxide bricks was condensed, and accordingly the concentration of the $Cr_2O_3$ capable of being included in the molten glass to be formed into fibers after passing through the melting furnace in a short time does not exceed the maximum concentration of $Cr_2O_3$ in the glass lump.

Accordingly, next, a glass batch was prepared so as to contain chromium oxide ($Cr_2O_3$) in a content of 0.10% by mass in relation to the total amount of the glass composition of present Example. Next, the chromium oxide-containing glass batch was placed in a platinum crucible, and maintained in an electric furnace at a temperature of 1550° C. for 6 hours to be melted under stirring to yield a uniform molten glass. Next, the obtained molten glass was allowed to flow out on a carbon plate to prepare glass cullet.

In a 60×30×15 mm platinum boat, 40 g of the obtained glass cullet was placed, melted in an electric furnace at 1550° C. for 2 hours, then decreased in temperature to 1250° C. lower than the controlled temperature of the bushing, and maintained at 1250° C. for 12 hours. Next, the glass was removed from the platinum boat, the interface portion on the platinum surface with the glass was observed by using a laser microscope (trade name: Laser Scanning Microscope LEXT OLS, manufactured by Olympus Corp.) at a magnification of 200, and thus the occurrence or nonoccurrence of the red crystals was examined. The results thus obtained are shown in FIG. 1.

It is to be noted that when the number of the crystals of 10 μm or more was 5 or less in the view field (1.30×1.05 mm) at the microscope magnification of 200, the precipitation of the red crystals was determined not to occur.

Example 2

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 58.8% by mass and $B_2O_3$ in a content of 1.0% by mass. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 2:
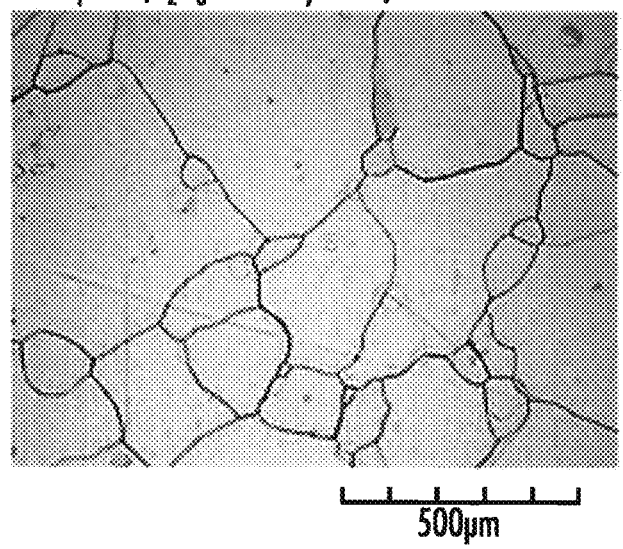
FIG. 2 is a laser microscope photograph showing the occurrence or nonoccurrence of the red crystals in the glass obtained from the glass composition of Example 2.

Next, a chromium oxide-containing glass cullet was prepared in exactly the same manner as in Example 1 except that the glass batch obtained in present Example was used, and in exactly the same manner as in Example 1, the obtained glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 2.

Example 3

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 58.3% by mass and $B_2O_3$ in a content of 1.5% by mass. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 3:
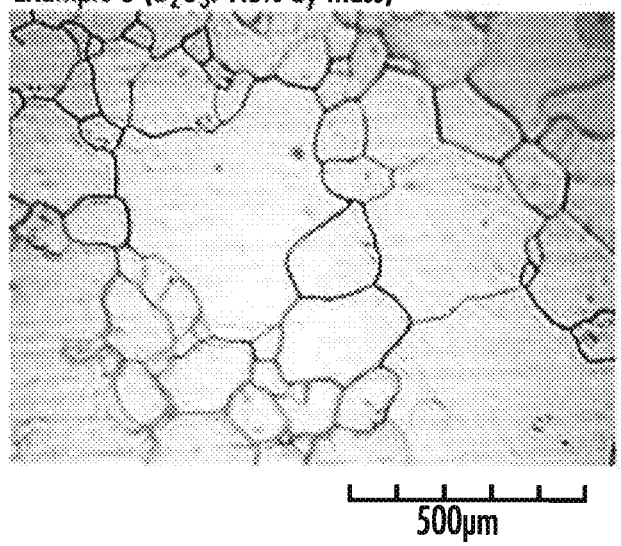
FIG. 3 is a laser microscope photograph showing the occurrence or nonoccurrence of the red crystals in the glass obtained from the glass composition of Example 3.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 3.

Example 4

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 59.2% by mass and $Li_2O$ in a content of 0.6% by mass, but absolutely not including $B_2O_3$. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 4:
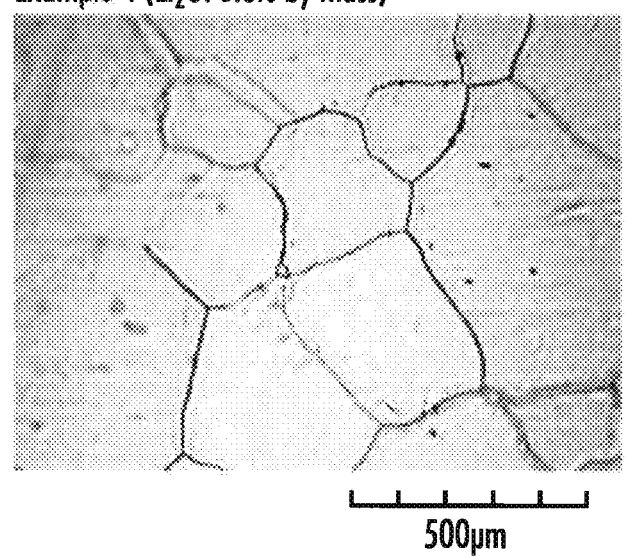
FIG. 4 is a laser microscope photograph showing the occurrence or nonoccurrence of the red crystals in the glass obtained from the glass composition of Example 4.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 4.

Example 5

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, SiO$_2$ in a content of 58.8% by mass and Li$_2$O in a content of 1.0% by mass, but absolutely not including B$_2$O$_3$. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 5:
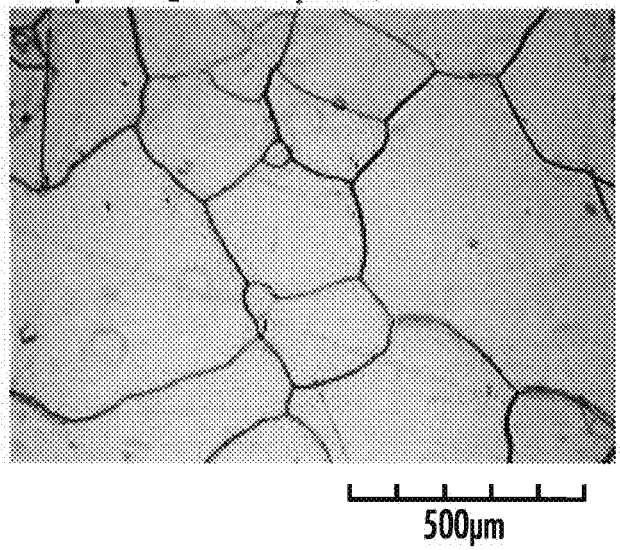
FIG. 5 is a laser microscope photograph showing the occurrence or nonoccurrence of the red crystals in the glass obtained from the glass composition of Example 5.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 5.

Example 6

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, SiO$_2$ in a content of 58.9% by mass, B$_2$O$_3$ in a content of 0.6% by mass and Li$_2$O in a content of 0.3% by mass. The glass composition of present Example includes, in relation to the total amount thereof, B$_2$O$_3$ and Li$_2$O as a mixture of these in a content of 0.9% by mass. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 6:
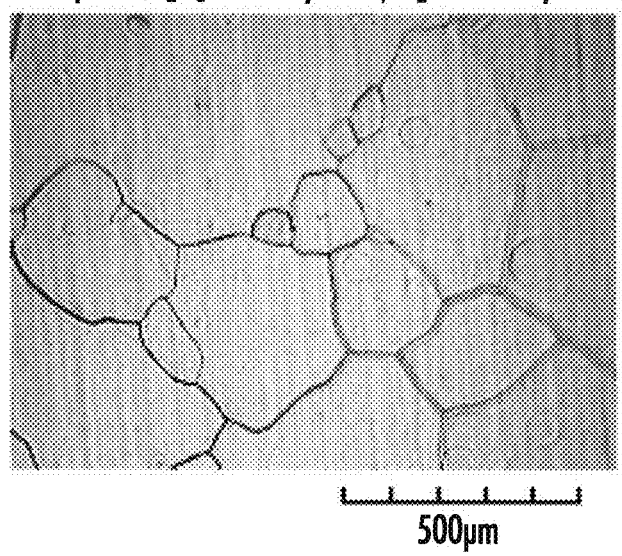
FIG. 6 is a laser microscope photograph showing the occurrence or nonoccurrence of the red crystals in the glass obtained from the glass composition of Example 6.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 6.

Example 7

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, SiO$_2$ in a content of 59.6% by mass, Al$_2$O$_3$ in a content of 18.2% by mass, MgO in a content of 9.2% by mass, CaO in a content of 11.8% by mass, B$_2$O$_3$ in a content of 0.9% by mass, Li$_2$O in a content of 0.1% by mass, and Na$_2$O, K$_2$O and Fe$_2$O$_3$ as the other components in a content of 0.2% by mass. The glass composition of present Example includes, in relation to the total amount thereof, B$_2$O$_3$ and Li$_2$O as a mixture of these in a content of 1.0% by mass. The composition of the glass composition obtained by melting the glass batch of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 1.

Figure 7:
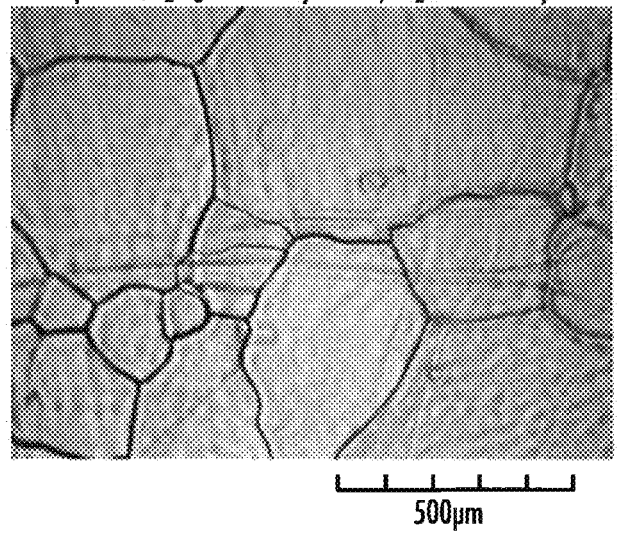
FIG. 7 is a laser microscope photograph showing the occurrence or nonoccurrence of the red crystals in the glass obtained from the glass composition of Example 7.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 7.

Example 8

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, SiO$_2$ in a content of 58.8% by mass, Al$_2$O$_3$ in a content of 19.5% by mass, MgO in a content of 9.0% by mass, CaO in a content of 12.0% by mass, B$_2$O$_3$ in a content of 0.5% by mass, and Na$_2$O, K$_2$O and Fe$_2$O$_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 2.

Figure 8:
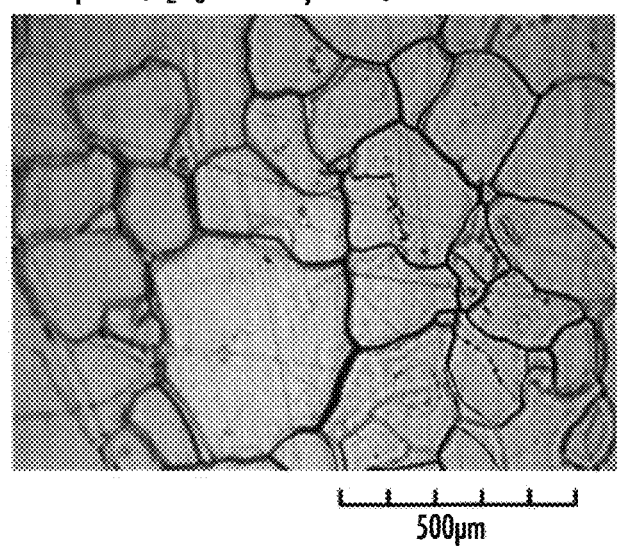
FIG. 8 is a laser microscope photograph showing the occurrence or nonoccurrence of the red crystals in the glass obtained from the glass composition of Example 8.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 8.

Example 9

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 58.8% by mass, $Al_2O_3$ in a content of 19.0% by mass, MgO in a content of 9.0% by mass, CaO in a content of 12.0% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 2.

Figure 9:
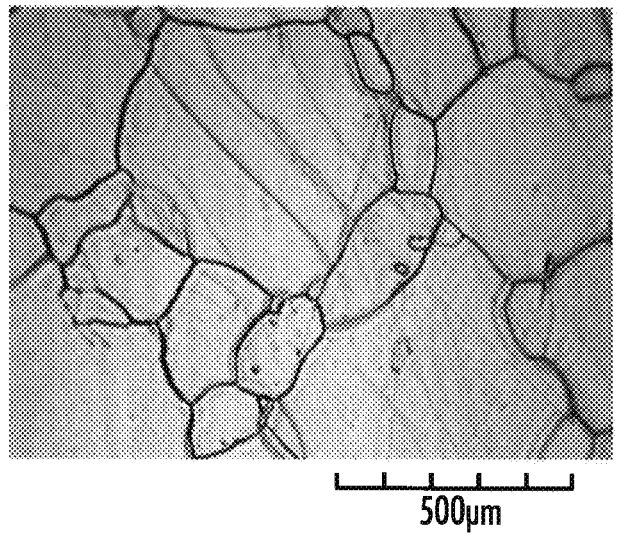
FIG. 9 is a laser microscope photograph showing the occurrence or nonoccurrence of the red crystals in the glass obtained from the glass composition of Example 9.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 9.

Example 10

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 58.8% by mass, $Al_2O_3$ in a content of 18.5% by mass, MgO in a content of 9.0% by mass, CaO in a content of 12.0% by mass, $B_2O_3$ in a content of 1.5% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquid phase temperature and the working temperature range of the glass composition of present Example, and the fiber strength and the fiber modulus of elasticity of the glass fibers (monofilaments) obtained in present Example. The results thus obtained are shown in Table 2.

Figure 10:
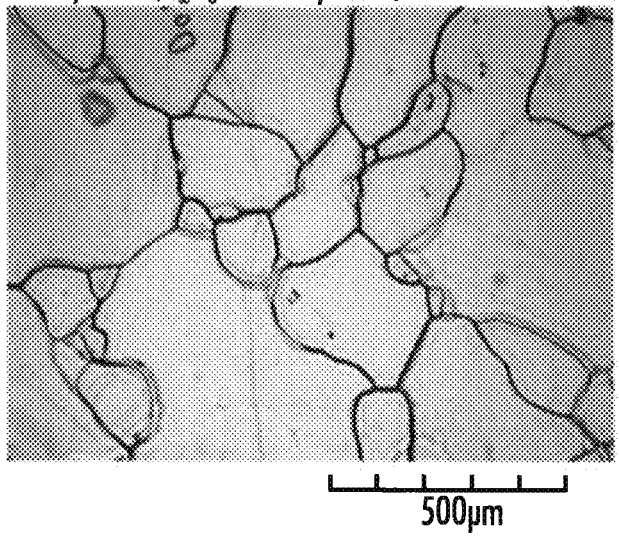
FIG. 10 is a laser microscope photograph showing the occurrence or nonoccurrence of the red crystals in the glass obtained from the glass composition of Example 10.
Figure 11:
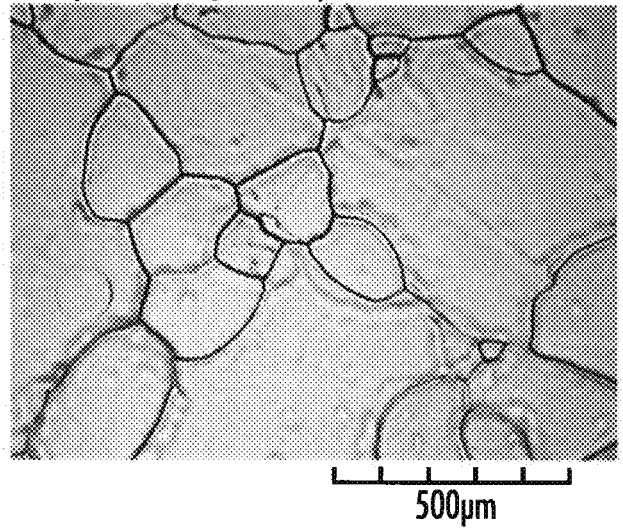
FIG. 11 is a laser microscope photograph showing the occurrence or nonoccurrence of the red crystals in the glass obtained from the glass composition of Example 11.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 10.

Example 11

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 62.0% by mass, $Al_2O_3$ in a content of 16.0% by mass, MgO in a content of 8.8% by mass, CaO in a content of 12.0% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, the fiber strength and the fiber modulus of elasticity of the glass fibers (monofilaments) obtained in present Example were measured in exactly the same manner as in Example 1. The results thus obtained are shown in Table 2.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 11.

Example 12

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 59.0% by mass, $Al_2O_3$ in a content of 18.0% by mass, MgO in a content of 8.0% by mass, CaO in a content of 13.8% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 2.

Figure 12:
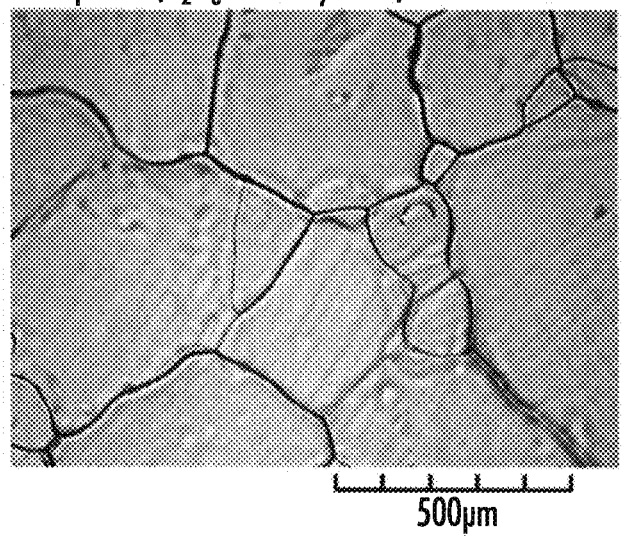
FIG. 12 is a laser microscope photograph showing the occurrence or nonoccurrence of the red crystals in the glass obtained from the glass composition of Example 12.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 12.

Example 13

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 58.3% by mass, $Al_2O_3$ in a content of 18.0% by mass, MgO in a content of 9.0% by mass, CaO in a content of 13.5% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 2.

Figure 13:
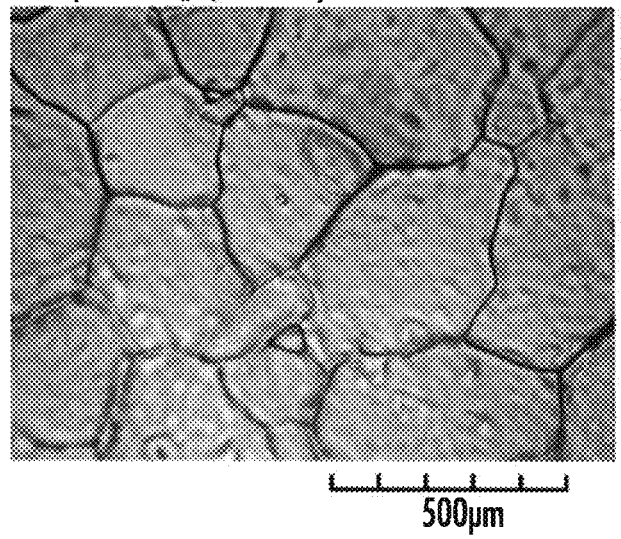
FIG. 13 is a laser microscope photograph showing the occurrence or nonoccurrence of the red crystals in the glass obtained from the glass composition of Example 13.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 13.

Example 14

In present Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 59.8% by mass, $Al_2O_3$ in a content of 20.0% by mass, MgO in a content of 8.0% by mass, CaO in a content of 11.0% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Example is shown in Table 2.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 2.

Figure 14:
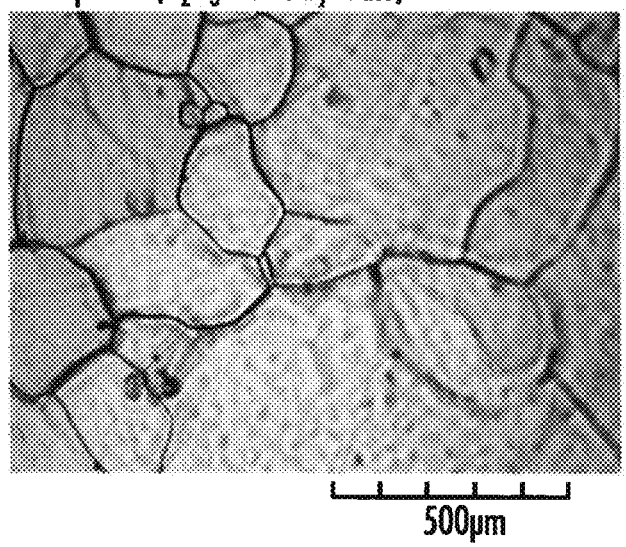
FIG. 14 is a laser microscope photograph showing the occurrence or nonoccurrence of the red crystals in the glass obtained from the glass composition of Example 14.

Next, a chromium oxide-containing glass cullet was prepared in exactly the same manner as in Example 1 except that the glass batch obtained in present Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 14.

Comparative Example 1

In present Comparative Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 59.8% by mass, but absolutely not including $B_2O_3$. The composition of the glass composition obtained by melting the glass batch of present Comparative Example is shown in Table 3.

Figure 15:
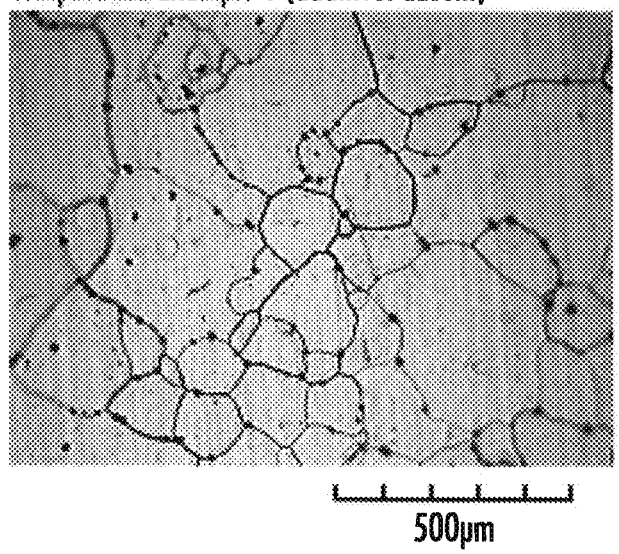
FIG. 15 is a laser microscope photograph showing the occurrence or nonoccurrence of the red crystals in the glass obtained from the glass composition of Comparative Example 1.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 15.

Comparative Example 2

In present Comparative Example, a glass batch was obtained in exactly the same manner as in Example 2 except that $Na_2O$ was used in place of $B_2O_3$. The composition of the glass composition obtained by melting the glass batch of present Comparative Example is shown in Table 3.

Figure 16:
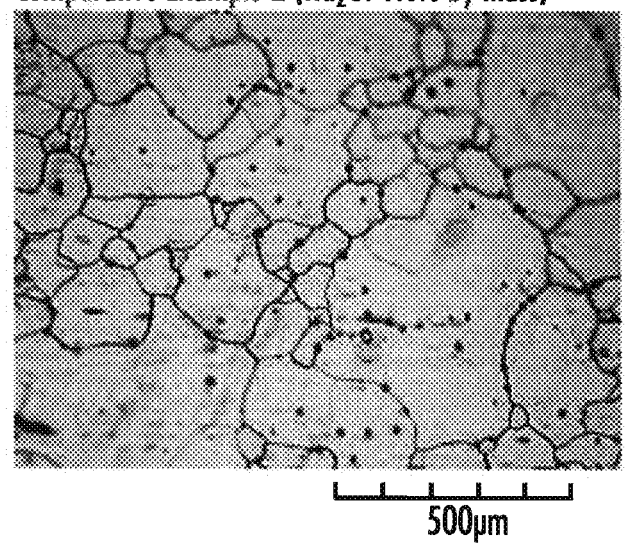
FIG. 16 is a laser microscope photograph showing the occurrence or nonoccurrence of the red crystals in the glass obtained from the glass composition of Comparative Example 2.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 16.

Comparative Example 3

In present Comparative Example, a glass batch was obtained in exactly the same manner as in Example 2 except that $K_2O$ was used in place of $B_2O_3$. The composition of the glass composition obtained by melting the glass batch of present Comparative Example is shown in Table 3.

Figure 17:
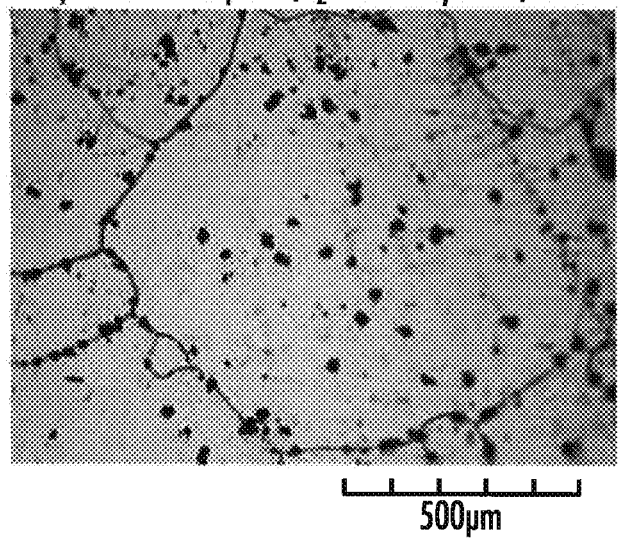
FIG. 17 is a laser microscope photograph showing the occurrence or nonoccurrence of the red crystals in the glass obtained from the glass composition of Comparative Example 3.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 17.

Comparative Example 4

In present Comparative Example, a glass batch was obtained in exactly the same manner as in Example 2 except that SrO was used in place of $B_2O_3$. The composition of the glass composition obtained by melting the glass batch of present Comparative Example is shown in Table 3.

Figure 18:
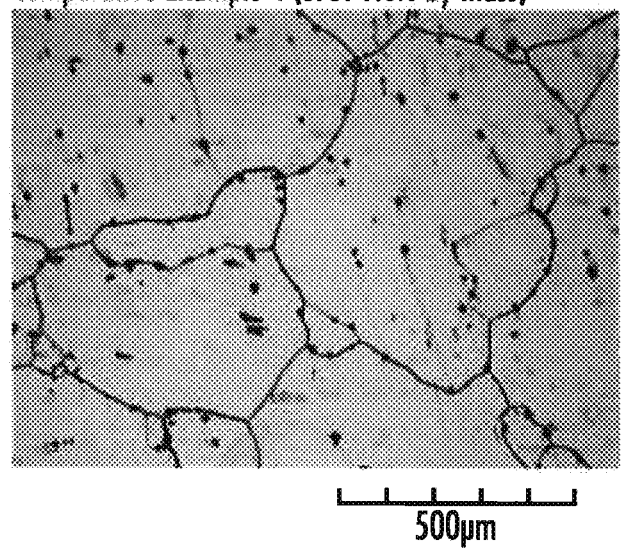
FIG. 18 is a laser microscope photograph showing the occurrence or nonoccurrence of the red crystals in the glass obtained from the glass composition of Comparative Example 4.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 18.

Comparative Example 5

In present Comparative Example, a glass batch was obtained in exactly the same manner as in Example 2 except that $Y_2O_3$ was used in place of $B_2O_3$. The composition of the glass composition obtained by melting the glass batch of present Comparative Example is shown in Table 3.

Figure 19:
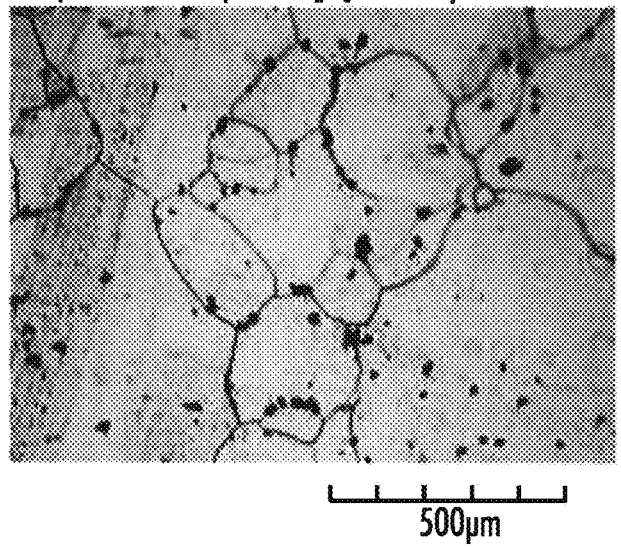
FIG. 19 is a laser microscope photograph showing the occurrence or nonoccurrence of the red crystals in the glass obtained from the glass composition of Comparative Example 5.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 19.

Comparative Example 6

In present Comparative Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 61.0% by mass, $Al_2O_3$ in a content of 20.0% by mass, MgO in a content of 12.0% by mass, CaO in a content of 5.8% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Comparative Example is shown in Table 3.

Figure 20:
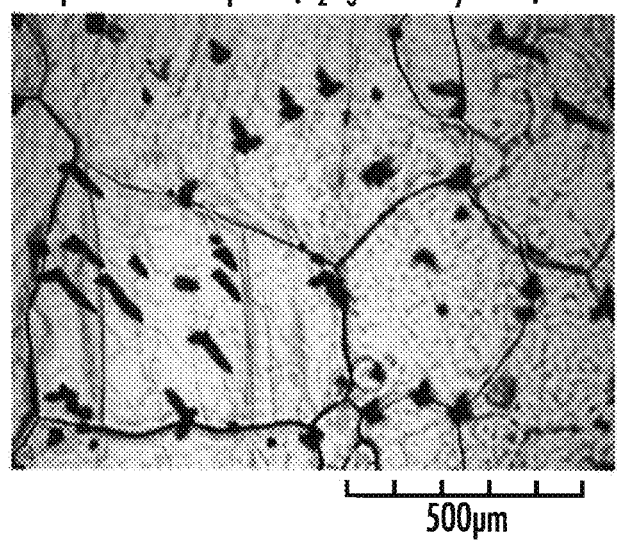
FIG. 20 is a laser microscope photograph showing the occurrence or nonoccurrence of the red crystals in the glass obtained from the glass composition of Comparative Example 6.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 20.

Comparative Example 7

In present Comparative Example, a glass batch was obtained in exactly the same manner as in Example 1 except that the glass batch was prepared by mixing the glass raw materials so as to give, when the resulting mixture was melted, a melt (molten glass) of a glass composition including, in relation to the total amount thereof, $SiO_2$ in a content of 57.1% by mass, $Al_2O_3$ in a content of 20.7% by mass, MgO in a content of 12.0% by mass, CaO in a content of 9.0% by mass, $B_2O_3$ in a content of 1.0% by mass, and $Na_2O$, $K_2O$ and $Fe_2O_3$ as the other components in a content of 0.2% by mass. The composition of the glass composition obtained by melting the glass batch of present Comparative Example is shown in Table 3.

Figure 21:
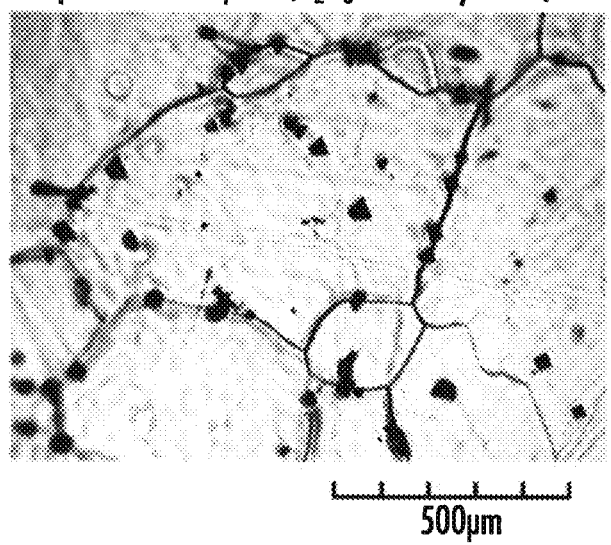
FIG. 21 is a laser microscope photograph showing the occurrence or nonoccurrence of the red crystals in the glass obtained from the glass composition of Comparative Example 7.

Next, a chromium oxide-containing glass cullet was prepared in exactly the same manner as in Example 1 except that the glass batch obtained in present Comparative Example was used, and in exactly the same manner as in Example 1, the glass cullet was placed in a platinum boat, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 21.

TABLE 3

| | Comparative Examples | | | | | | |
|---|---|---|---|---|---|---|---|
| | 1 | 2 | 3 | 4 | 5 | 6 | 7 |
| $SiO_2$ (% by mass) | 59.8 | 58.8 | 58.8 | 58.8 | 58.8 | 61.0 | 57.1 |
| $Al_2O_3$ (% by mass) | 19.0 | 19.0 | 19.0 | 19.0 | 19.0 | 20.0 | 20.7 |
| MgO (% by mass) | 10.0 | 10.0 | 10.0 | 10.0 | 10.0 | 12.0 | 12.0 |
| CaO (% by mass) | 11.0 | 11.0 | 11.0 | 11.0 | 11.0 | 5.8 | 9.0 |
| $Na_2O$ (% by mass) | — | 1.0 | — | — | — | — | — |
| $B_2O_3$ (% by mass) | — | — | — | — | — | 1.0 | 1.0 |
| $K_2O$ (% by mass) | — | — | 1.0 | — | — | — | — |
| SrO (% by mass) | — | — | — | 1.0 | — | — | — |
| $Y_2O_3$ (% by mass) | — | — | — | — | 1.0 | — | — |
| Others (% by mass) | 0.2 | 0.2 | 0.2 | 0.2 | 0.2 | 0.2 | 0.2 |

As can be seen from FIGS. 15 to 19 and Table 3, in the case where $B_2O_3$ and $Li_2O$ are absolutely not included (Comparative Example 1) or in the case where in place of

TABLE 1

| | Examples | | | | | | |
|---|---|---|---|---|---|---|---|
| | 1 | 2 | 3 | 4 | 5 | 6 | 7 |
| $SiO_2$ (% by mass) | 59.3 | 58.8 | 58.3 | 59.2 | 58.8 | 58.9 | 59.6 |
| $Al_2O_3$ (% by mass) | 19.0 | 19.0 | 19.0 | 19.0 | 19.0 | 19.0 | 18.2 |
| MgO (% by mass) | 10.0 | 10.0 | 10.0 | 10.0 | 10.0 | 10.0 | 9.2 |
| CaO (% by mass) | 11.0 | 11.0 | 11.0 | 11.0 | 11.0 | 11.0 | 11.8 |
| $B_2O_3$ (% by mass) | 0.5 | 1.0 | 1.5 | — | — | 0.6 | 0.9 |
| $Li_2O$ (% by mass) | — | — | — | 0.6 | 1.0 | 0.3 | 0.1 |
| Others (% by mass) | 0.2 | 0.2 | 0.2 | 0.2 | 0.2 | 0.2 | 0.2 |
| (R × CaO)/$Al_2O_3$ | 0.29 | 0.58 | 0.87 | 0.35 | 0.58 | 0.52 | 0.65 |
| $Li_2O/B_2O_3$ | 0.0 | 0.0 | 0.0 | — | — | 0.5 | 1.0 |
| 1000-Poise temperature (° C.) | 1338 | 1331 | 1321 | — | — | — | — |
| Liquid phase temperature (° C.) | 1229 | 1221 | 1215 | — | — | — | — |
| Working range temperature (° C.) | 109 | 110 | 106 | — | — | — | — |
| Fiber strength (GPa) | 4.3 | 4.2 | 4.1 | 4.1 | 4.1 | 4.2 | 4.3 |
| Fiber modulus of elasticity (GPa) | 85 | 84 | 83 | 84 | 83 | 84 | 83 |

In the table, "R" represents "the red crystal suppressing component," and "(R × CaO)/$Al_2O_3$" represents "(R (% by mass) × CaO (% by mass))/$Al_2O_3$ (% by mass)."

TABLE 2

| | Examples | | | | | | |
|---|---|---|---|---|---|---|---|
| | 8 | 9 | 10 | 11 | 12 | 13 | 14 |
| $SiO_2$ (% by mass) | 58.8 | 58.8 | 58.8 | 62.0 | 59.0 | 58.3 | 59.8 |
| $Al_2O_3$ (% by mass) | 19.5 | 19.0 | 18.5 | 16.0 | 18.0 | 18.0 | 20.0 |
| MgO (% by mass) | 9.0 | 9.0 | 9.0 | 8.8 | 8.0 | 9.0 | 8.0 |
| CaO (% by mass) | 12.0 | 12.0 | 12.0 | 12.0 | 13.8 | 13.5 | 11.0 |
| $B_2O_3$ (% by mass) | 0.5 | 1.0 | 1.5 | 1.0 | 1.0 | 1.0 | 1.0 |
| $Li_2O$ (% by mass) | 0.0 | 0.0 | 0.0 | 0.0 | 0.0 | 0.0 | 0.0 |
| Others (% by mass) | 0.2 | 0.2 | 0.2 | 0.2 | 0.2 | 0.2 | 0.2 |
| (R × CaO)/$Al_2O_3$ | 0.31 | 0.63 | 0.97 | 0.75 | 0.77 | 0.75 | 0.55 |
| $Li_2O/B_2O_3$ | 0.0 | 0.0 | 0.0 | 0.0 | 0.0 | 0.0 | 0.0 |
| 1000-Poise temperature (° C.) | 1334 | 1333 | 1325 | — | — | 1317 | 1365 |
| Liquid phase temperature (° C.) | 1241 | 1223 | 1207 | — | — | 1220 | 1253 |
| Working range temperature (° C.) | 93 | 110 | 118 | — | — | 97 | 112 |
| Fiber strength (GPa) | 4.2 | 4.3 | 4.0 | 4.3 | 4.1 | 4.1 | 4.0 |
| Fiber modulus of elasticity (GPa) | 84 | 84 | 83 | 81 | 82 | 82 | 82 |

In the table, "R" represents "the red crystal suppressing component," and "(R × CaO)/$Al_2O_3$" represents "(R (% by mass) × CaO (% by mass))/$Al_2O_3$ (% by mass)."

$B_2O_3$ or $Li_2O$, any one of $Na_2O$, $K_2O$, SrO and $Y_2O_3$ is included (Comparative Examples 2 to 5), microparticles (red crystals) are generated in the interface portion on the platinum surface with the glass.

In contrast, as can be seen from FIGS. 1 to 14 and Tables 1 and 2, in the case where either of $B_2O_3$ and $Li_2O$, or a mixture composed of $B_2O_3$ and $Li_2O$ is included in a content of 0.5 to 1.5% by mass of the total amount of the glass composition (Examples 1 to 7), microparticles (red crystals) are not generated at all in the interface portion on the platinum surface with the glass.

However, as can be seen from FIGS. 20 and 21 and Table 3, in the case where $B_2O_3$ is included in a content of 1.0% by mass of the total amount of the glass composition, but the content of CaO is less than 9.0% by mass (Comparative Example 6) or the content of $Al_2O_3$ exceeds 20.0% by mass (Comparative Example 7), microparticles are generated in the interface portion on the platinum surface with the glass, and the generation of red crystals cannot be suppressed.

Accordingly, it is apparent that according to the production method of the present invention, by using the glass compositions of Examples 1 to 14, the spinning of glass fibers can be stably performed without mixing of red crystals in glass fibers.

As can be seen from Tables 1 and 2, according to the production method of the present invention, it is possible to obtain glass fibers having a sufficient fiber modulus of elasticity of 80 GPa or more and a sufficient fiber strength of 4.0 GPa or more.

Example 15

In present Example, the glass batch obtained in Example 1 was melted in a large size furnace in which the portion brought into contact with the molten glass was formed of chromium oxide bricks, and the obtained molten glass was discharged from the nozzle tips of a bushing regulated at a temperature of 1300° C. The nozzle tips have oval-shaped orifice holes.

Consequently, there were obtained glass fibers having an elongated oval-shaped cross section and having a modified cross section in which the ratio (major axis/minor axis) of the major axis to the minor axis of the cross sectional shape was 4.

The obtained glass fibers having a modified cross section did not include red crystals, and the spinning of the glass fibers was able to be performed without occurrence of spun fiber breakage over 8 hours or more.

Example 16

In present Example, the glass batch obtained in Example 1 was melted in a large size furnace in which the portion brought into contact with the molten glass was formed of chromium oxide bricks, and the obtained molten glass was discharged from the nozzle tips of a bushing regulated at a temperature of 1350° C. The nozzle tips have circle-shaped orifice holes of 1 mm in diameter.

Consequently, there were obtained glass fibers having a circular cross sectional shape and having a fiber diameter of 5 μm.

The obtained glass fibers having a circular cross sectional shape and a fiber diameter of 5 μm did not include red crystals, and the spinning of the glass fibers was able to be performed without occurrence of spun fiber breakage over 8 hours or more.

The invention claimed is:

1. A method for producing glass fiber, when glass fibers are formed by discharging, from a nozzle tip, a molten glass obtained by melting glass raw materials mixed so as to give a glass composition comprising, when melted, in relation to the total amount thereof, $SiO_2$ in a range from 57.0 to 58.8% by mass, $Al_2O_3$ in a range from 18.0 to 20.0% by mass, MgO in a range from 7.5 to 12.0% by mass, and CaO in a range from 9.0 to 12.5% by mass, and having a total content of $SiO_2$, $Al_2O_3$, MgO and CaO of 98.0% by mass or more, the glass composition comprises $B_2O_3$, or a combination of $B_2O_3$ and $Li_2O$, as an additive or additives capable of suppressing generation of red crystals,
   wherein a ratio of the product between a content of the additive or additives capable of suppressing generation of red crystals (% by mass) and the content (% by mass) of CaO to the content (% by mass) of $Al_2O_3$ is in a range from 0.25 to 1.00.

2. The method for producing glass fiber according to claim 1, wherein the glass fibers each have a modified cross sectional shape in which a ratio (major axis/minor axis) of the major axis to the minor axis of the cross sectional shape falls within a range from 2.0 to 6.0.

3. The method for producing glass fiber according to claim 1, wherein the glass fibers each have a modified cross sectional shape in which a fiber diameter defined as a diameter when a cross-sectional area is converted to a perfect circle, falls within a range from 10 to 30 μm.

4. The method for producing glass fiber according to claim 1, wherein the glass fibers have perfect circular cross sections, and fiber diameters falling within a range of 3 μm or more to less than 10 μm.

5. The method for producing glass fiber according to claim 1, wherein the glass raw materials mixed so as to give the glass composition are melted by using a melting furnace in which a portion in contact with the molten glass is formed of bricks containing chromium oxide.

6. The method for producing glass fiber according to claim 1, wherein the glass composition comprises $B_2O_3$ as the additive capable of suppressing the generation of red crystals, in a content of 0.5 to 1.5% by mass in relation to the total amount of the glass composition.

7. The method for producing glass fiber according to claim 1, wherein the glass composition comprises $B_2O_3$ and $Li_2O$ as the additives capable of suppressing the generation of red crystals, in a content of 0.5 to 1.5% by mass in relation to the total amount of the glass composition.

8. The method for producing glass fiber according to claim 1, wherein in the glass composition, an 1000-poise temperature thereof is a temperature falling within a range from 1300 to 1370° C., a liquid phase temperature thereof is a temperature falling within a range from 1200 to 1270° C., and a working temperature range thereof is 50° C. or higher.

9. The method for producing glass fiber according to claim 1, wherein the glass fibers each have a modified cross sectional shape in which a ratio (major axis/minor axis) of the major axis to the minor axis of the cross sectional shape falls within a range from 2.0 to 6.0, and a fiber diameter defined as a diameter when a cross-sectional area is converted to a perfect circle, falls within a range from 10 to 30 μm.

10. The method for producing glass fiber according to claim 1, wherein the glass composition comprises CaO in a range of 10.3 to 12.5% by mass.

11. The method for producing glass fiber according to claim 1, wherein the glass composition comprises MgO in a range of 8.8 to 12.0% by mass.

* * * * *